US00RE38620E1

(19) United States
(12) Reissued Patent
Thompson

(10) Patent Number: US RE38,620 E
(45) Date of Reissued Patent: Oct. 12, 2004

(54) OPTICAL MULTIPLEXER/DEMULTIPLEXER

(75) Inventor: George Horace Brooke Thompson, Herts (GB)

(73) Assignee: Nortel Networks Limited, St. Laurent (CA)

(21) Appl. No.: 10/014,656

(22) Filed: Dec. 11, 2001

Related U.S. Patent Documents

Reissue of:
(64) Patent No.: 6,111,996
Issued: Aug. 29, 2000
Appl. No.: 09/042,254
Filed: Mar. 13, 1998

(51) Int. Cl.[7] ..... G02B 6/293
(52) U.S. Cl. ..... 385/24; 385/39; 398/82; 398/87
(58) Field of Search ..... 385/3, 7, 15, 24, 385/27, 39; 359/115, 124, 127, 130; 398/48, 79, 82, 84, 87

(56) References Cited

U.S. PATENT DOCUMENTS

| | | | | | |
|---|---|---|---|---|---|
| 4,508,422 | A | * | 4/1985 | Karlsson | 359/201 |
| 5,414,548 | A | * | 5/1995 | Tachikawa et al. | 398/87 |
| 5,450,512 | A | * | 9/1995 | Asakura | 385/48 |
| 5,748,811 | A | * | 5/1998 | Amersfoort et al. | 385/15 |
| 5,832,362 | A | * | 11/1998 | Trokhan | 422/186.3 |

FOREIGN PATENT DOCUMENTS

| | | | | |
|---|---|---|---|---|
| EP | 0 254 453 A2 | * | 7/1987 | |
| EP | 0 365 125 | | 4/1990 | |
| EP | 0 591 042 | | 4/1994 | |
| EP | 0 826 989 | | 3/1998 | |
| GB | 2 222 891 | * | 3/1990 | G02B/5/18 |
| WO | WO 98/04944 | | 2/1998 | |

OTHER PUBLICATIONS

Ishida et al, "Loss–Imbalance Equalization in Arrayed–Waveguide–Grating (AWG) Multiplexer Cascades", 8217 Journal of Lightwave Technology 13 (Jun. 1995), No. 6, New York, NY USA, pp. 1155–1163.*

Tsai et al, "Multiband Wavelength–Division Demultiplexing With A Cascaded Substrate–Mode Grating Structure", Applied Optics, vol. 34, No. 25, Sep. 1, 1995, pp. 5582–5588.*

Dragone et al, "Integrated Optics N×N Multiplexer . . . ", IEE Photonics Letters, vol. 3, No. 10, Oct. 1991.*

Kurokawa, T et al: "Time–Space–Conversion Optical Signal Processing Using Arrayed–Waveguide Grating", Electronics Letters, IEE Stevenage, GB, vol. 33, No. 22, Oct. 23, 1997, pp. 1890–1891.

* cited by examiner

*Primary Examiner*—John D. Lee
(74) *Attorney, Agent, or Firm*—Barnes & Thornburg

(57) ABSTRACT

A monolithic version of optical multiplexer/demultiplexer with an improved spectral characteristics is provided by two diffraction gratings arranged optically in tandem and with a field stop in the coupling between them, the gratings also being arranged to provide free spectral ranges differing by a factor of at least two, and having a coupling between them that carries over into the second grating information concerning the dispersion afforded by the first grating. The field stop is constituted by a pair of etched troughs arranged in the pattern of an open chevron.

4 Claims, 8 Drawing Sheets

OPTICAL MULTIPLEXER/DEMULTIPLEXER

Matter enclosed in heavy brackets [ ] appears in the original patent but forms no part of this reissue specification; matter printed in italics indicates the additions made by reissue.

BACKGROUND OF THE INVENTION

Optical Wavelength Division Multiplexed (WDM) systems ideally require passive optical wavelength multiplexers and demultiplexers which have isolated pass-bands which are flat-topped so as to allow a measure of tolerance in the spectral positioning of the individual signals of the WDM system within these pass-bands. One method of multiplexing or demultiplexing channels in an optical WDM system relies upon the use of multilayer dielectric interference filters. Another relies upon Bragg reflection effects created in optical fibres. A third method, the method with which the present invention is particularly concerned, relies upon diffraction grating effects.

One form that such a diffraction grating can take for wavelength multiplexing/demultiplexing is the form described in EP 0 254 453, which also refers, with particular reference to its FIG. 5, to the possibility of having a tandem arrangement of two diffraction gratings arranged to provide a combined intensity transfer function that is the product of the intensity transfer function of its component diffraction grating 40 with that of its component diffraction grating 42.

An alternative form that such a diffraction grating can take is an optical waveguide grating that includes a set of optical waveguides in side-by-side array, each extending from one end of the array to the other, and being of uniformly incrementally greater optical path length from the shortest at one side of the array to the longest at the other. Such an optical grating constitutes a component of the multiplexer described by C Dragone et al., 'Integrated Optics N×N Multiplexer on Silicon', IEEE Photonics Technology Letters, Vol. 3, No. 10, October 1991, pages 896–9. Referring to FIG. 1, the basic components of a 4-port version of such a multiplexer comprise an optical waveguide grating, indicated generally at 10, where two ends are optically coupled by radiative stars, indicated schematically at 11 and 12, respectively with input and output sets of waveguides 13 and 14. Monochromatic light launched into one of the waveguides of set 13 spreads out in radiative star 11 to illuminate the input ends of all the waveguides of the grating 10. At the far end of the grating 10 the field components of the emergent light interfere coherently in the far-field to produce a single bright spot at the far side of the radiative star 12. Scanning the wavelength of the light causes a slip in the phase relationship of these field components, with the result that the bright spot traverses the inboard ends of the output set of waveguides 14 linearly with wavelengths as depicted at 15. If the mode size of the waveguides 14 is well matched with the size of the bright spot, then efficient coupling occurs at each of the wavelengths at which the bright spot precisely registers with one of those waveguides 14. Either side of these specific wavelengths the power falls off in a typically Gaussian manner as depicted at 15. While this may allow acceptable extinction to be achieved between channels, it is far from the ideal of a flat-topped response.

A tandem arrangement of this alternative form of diffraction grating can also be constructed, an example of such an arrangement being described in EP 0 591 042 with particular reference to its FIG. 3. This tandem arrangement similarly provides a combined intensity transfer function that is the product of the intensity transfer functions of its two component diffraction gratings. The response of this tandem arrangement also provides a typically Gaussian fall off in power that is similarly far from the ideal of a flat-topped response.

A construction of multiplexer/demultiplexer that also uses a tandem arrangement of optical waveguide gratings, but which is capable of achieving a response that is more nearly flat-topped without introducing an excessive insertion loss is described in the specification of WO 98/04944, to which specification attention is specifically directed and its teaching incorporated herein by reference.

WO 98/04944 discusses the desirability, at least in some circumstances, of incorporating some form of field stop between the two optical waveguide diffraction gratings of a tandem pair. In bulk-optics composite optical systems, a field stop is typically constituted by a diaphragm of opaque, usually black, material that is provided with an aperture through which light is able to pass. The size and shape of this aperture determines the cross-sectional area of the pencil of light that is able to couple, by penetration through the aperture, from an optical system on one side of the diaphragm into an optical system on the other side. The function of the field stop is to define the boundaries of this cross-sectional area, typically for the purpose of permitting the passage of as much light as is consistent with maintaining a desired quality of imaging. If the two optical systems are optically coupled by means of a reflector, this same function of defining the boundaries of the cross-sectional area of the pencil of light that optically couples the two systems may alternatively be effected by definition of the boundaries of the reflector itself. The sole example of field stop specifically exemplified in WO 98/04944 is a field stop of this latter (reflection type) kind.

SUMMARY OF THE INVENTION

The present invention is directed to the provision of transmission type field stops of the type described in the specification of WO 98/04944 where one optical waveguide diffraction grating is directly coupled, without reflection, with another optical waveguide diffraction grating.

An object of the present invention is to devise a method of providing such as field stop, the method being one that is readily capable of being implemented in the construction of a multiplexer/demultiplexer in which the two gratings are formed in the same monolithic integrated optics structure.

According to the present invention there is provided an optical multiplexer/demultiplexer for the multiplexing/demultiplexing of optical signal channels at a substantially uniform optical frequency spacing, which multiplexer/demultiplexer includes, in an integrated waveguide optics structure, a set of input/output ports optically coupled with an output/input port via a tandem arrangement of first and second optical waveguide diffraction gratings that provide multiple optical waveguide paths from each member of the set of input-output ports to the output/input port via different grating elements of the gratings, wherein the difference in optical path length occasioned by paths via adjacent optical waveguide elements of the first grating is greater than that occasioned by paths via adjacent optical waveguide elements of the second grating, wherein said difference in optical path length defines for its associated grating a frequency range, the Free Spectral Range, being the frequency range over which said optical path length difference produces a phase difference whose value ranges over $2\pi$, wherein the Free Spectral Range of the first diffraction grating is matched with the optical frequency spacing of the optical signal channels, wherein the Free Spectral Range of the second diffraction grating is at least as great as *the sum formed by the addition of the difference in frequency between adjacent frequency channels of the multiplexer/demultiplexer to* the difference in frequency between the highest and lowest frequency channels of the multiplexer/demultiplexer, wherein the portion of the optical coupling between the set of input/output ports and the output/input port that extends between the first and second diffraction gratings couples spatial information between the two gratings in addition to intensity information, and includes a field stop constituted by a pair of reflecting facets, inclined at an acute angle to each other, created by the provision of wells in the integrated waveguide optics structure, and defining between them an aperture through which all light coupled between the first and second diffraction gratings is coupled, and wherein the length of the facets and the angle between them are related such that light emitted from either diffraction grating is not able, by multiple reflection in the facets, to couple into the other diffraction grating, or back into the same diffraction grating from which that light was emitted.

Other features and advantages of the invention will be readily apparent from the following description of preferred embodiments of the invention, the drawings and the claims.

DETAILED DESCRIPTION OF THE PREFERRED EMBODIMENT

Figure 1:
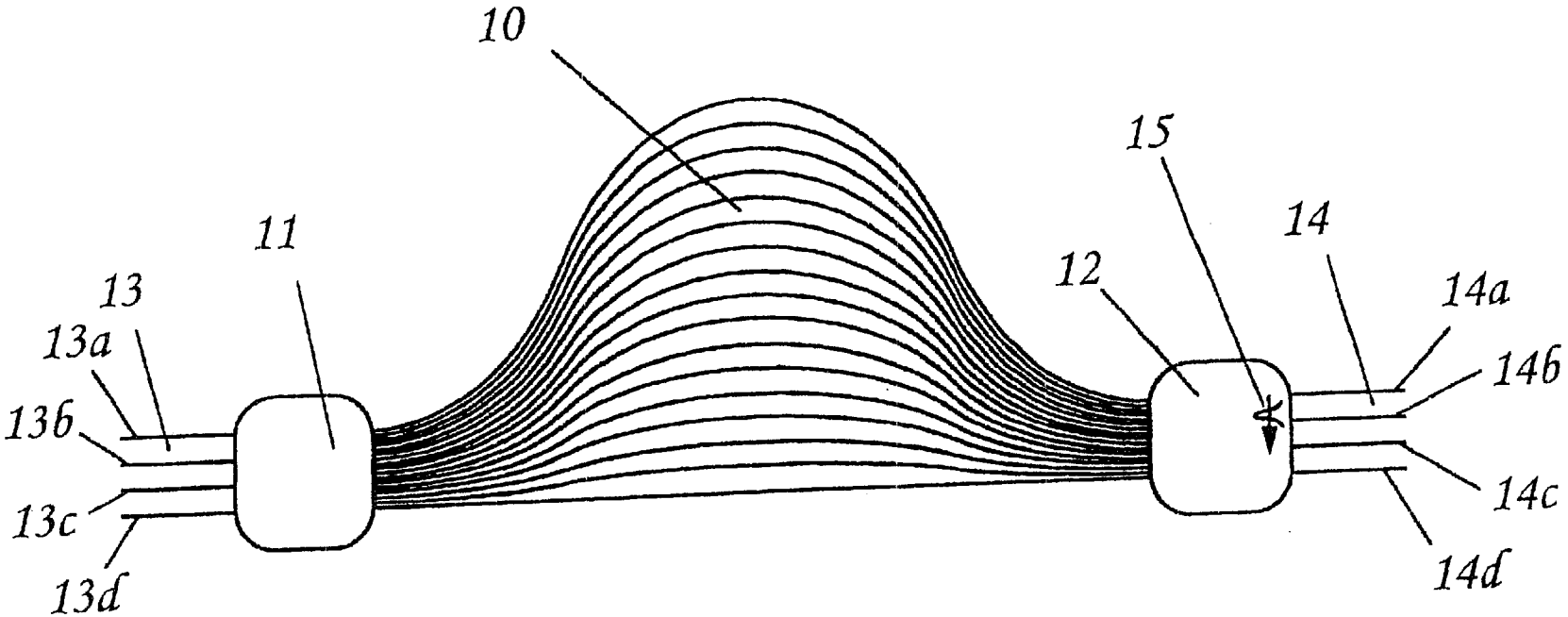
FIG. 1 (to which previous reference has already been made) schematically depicts a prior art optical multiplexer/demultiplexer employing an optical waveguide type diffraction grating.
Figure 2:
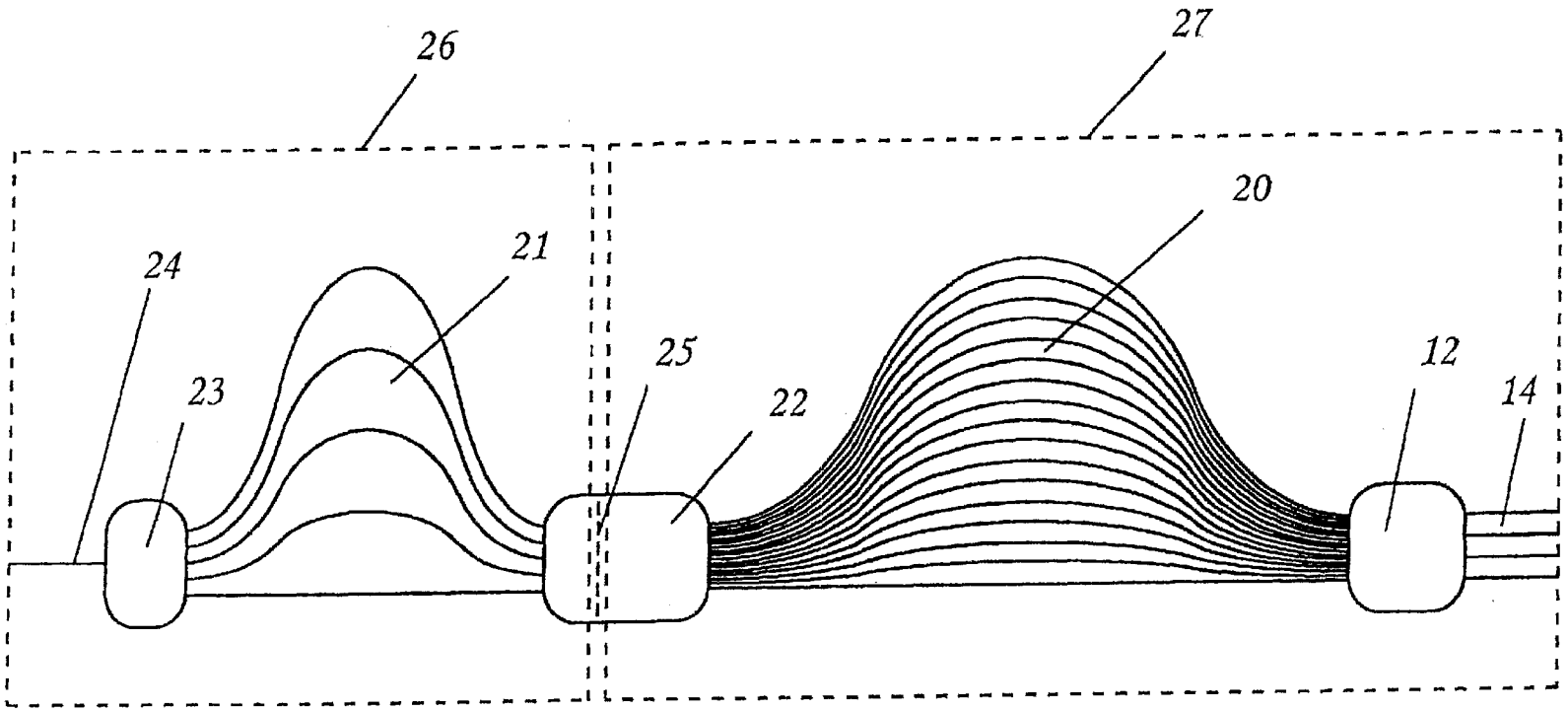
FIG. 2 is a schematic diagram of the configuration of a multiplexer/demultiplexer constructed in accordance with the teachings of the specification of PCT GB 97/02051.

A schematic diagram of a multiplexer/demultiplexer device constructed in accordance with the teachings of PCT GB 97/02051 (to which previous reference has already been made) is depicted in FIG. 2. This multiplexer/demultiplexer device has two optical waveguide diffraction gratings 20 and 21 optically in tandem. These gratings exhibit Free Spectral Ranges (FSRs) that differ in magnitude by a factor at least equal to the number of channels being separated. Grating 20 corresponds to grating 10 of FIG. 1 and, under the assumption that the left-hand side of the diagram of FIG. 1 is the input side, the output side to this grating is unchanged, comprising a coupling region 12 feeding a set of waveguides 14. In this particular instance the outboard ends of the waveguides 14 have been arranged into two groups for facilitating the coupling of those ends with the ends of two optical fibre ribbons (not shown). On the input side of grating 20, the radiative star coupling 11 is replaced by a coupling region 22 which provides optical coupling between grating 20 and grating 21. On the input side of grating 21 is a further optical coupling region 23 which, optically couples a single waveguide 24 with the input end of the input of grating 21. Each of these coupling regions functions as a device performing a Fourier Transform converting positional information into angular information, or vice versa. The coupling region 22 is in effect a tandem arrangement of two conventional type radiative stars arranged back-to-back and meeting in an 'image plane' 25. The first radiative star component of coupling region 22 operates to convert angular information received from one of the gratings into positional information at the 'image plane' 25, while the second converts it back into angular information again for launching into the other grating. Thus it is seen that this coupling region 22 couples both intensity and spatial information between the two gratings. (The two component radiative stars of coupling region 22 may normally be designed to meet in an 'image plane' 25 that is indeed a planar surface, but for certain geometries it may be preferred for this surface to have a curvature.)

It has previously been mentioned that WO 98/04944 discusses the desirability, at least in some circumstances, of incorporating some form of field stop between the two optical waveguide diffraction gratings of a tandem pair. If the optical waveguide diffraction gratings 20 and 21 of FIG. 2 were to be constructed in different integrated waveguide devices, then a field stop in the form of an opaque diaphragm provided with an aperture can, at least in principle, be readily introduced between the two integrated waveguide devices before they are secured in optical alignment with each other and with the diaphragm field stop. It is less easy to see how such a diaphragm could be introduced if a single monolithic integrated waveguide optics device were employed to replace the two integrated waveguide optics devices 26 and 27, such replacement being otherwise desirable in order to simplify the procedure necessary to provide acceptable quality of alignment between the two diffraction gratings 20 and 21.

Figure 3:
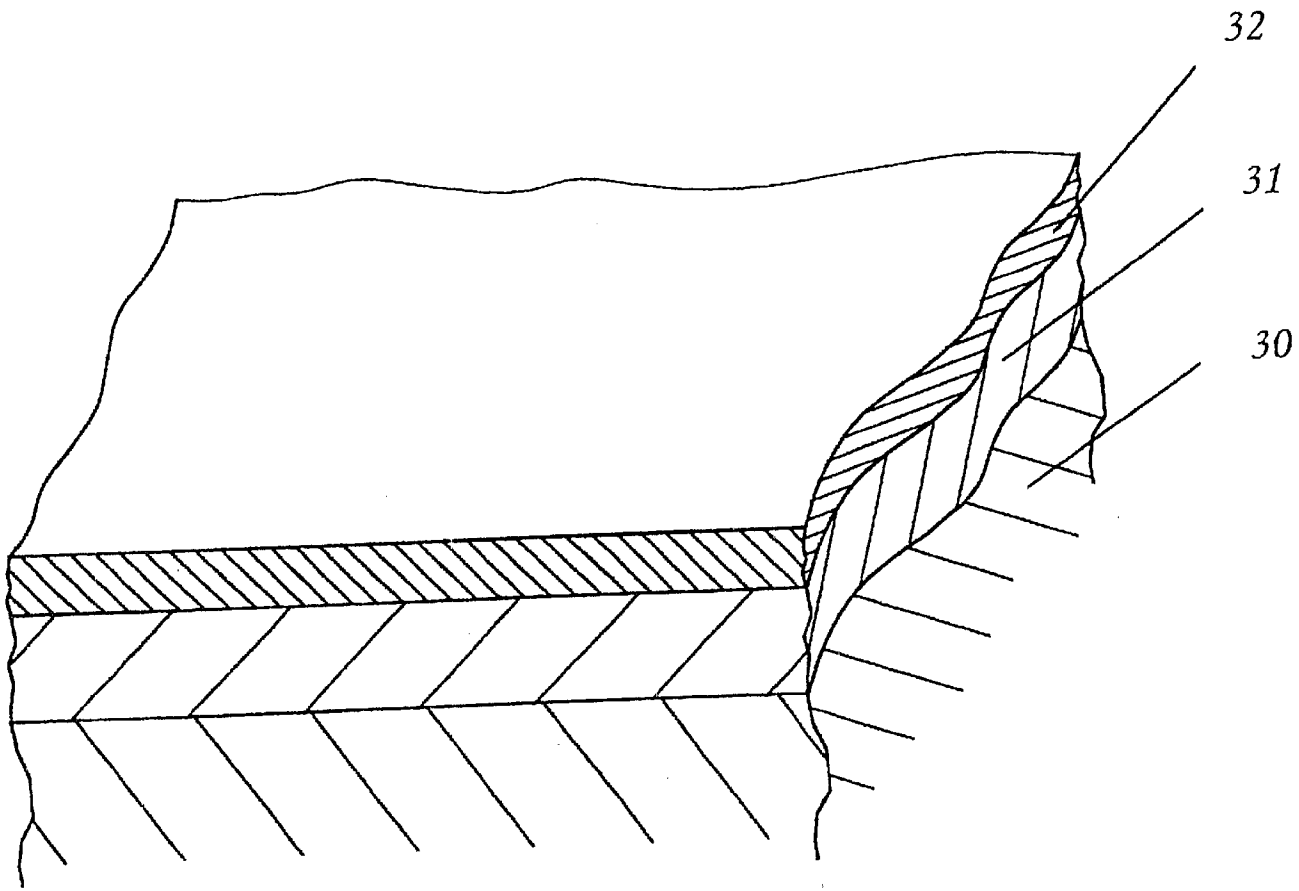
FIGS. 3, 4 and 5 are schematic diagrams of successive stages in the construction of an integrated waveguide optical device in which a multiplexer/demultiplexer embodying the invention is a preferred form is formed.
Figure 4:
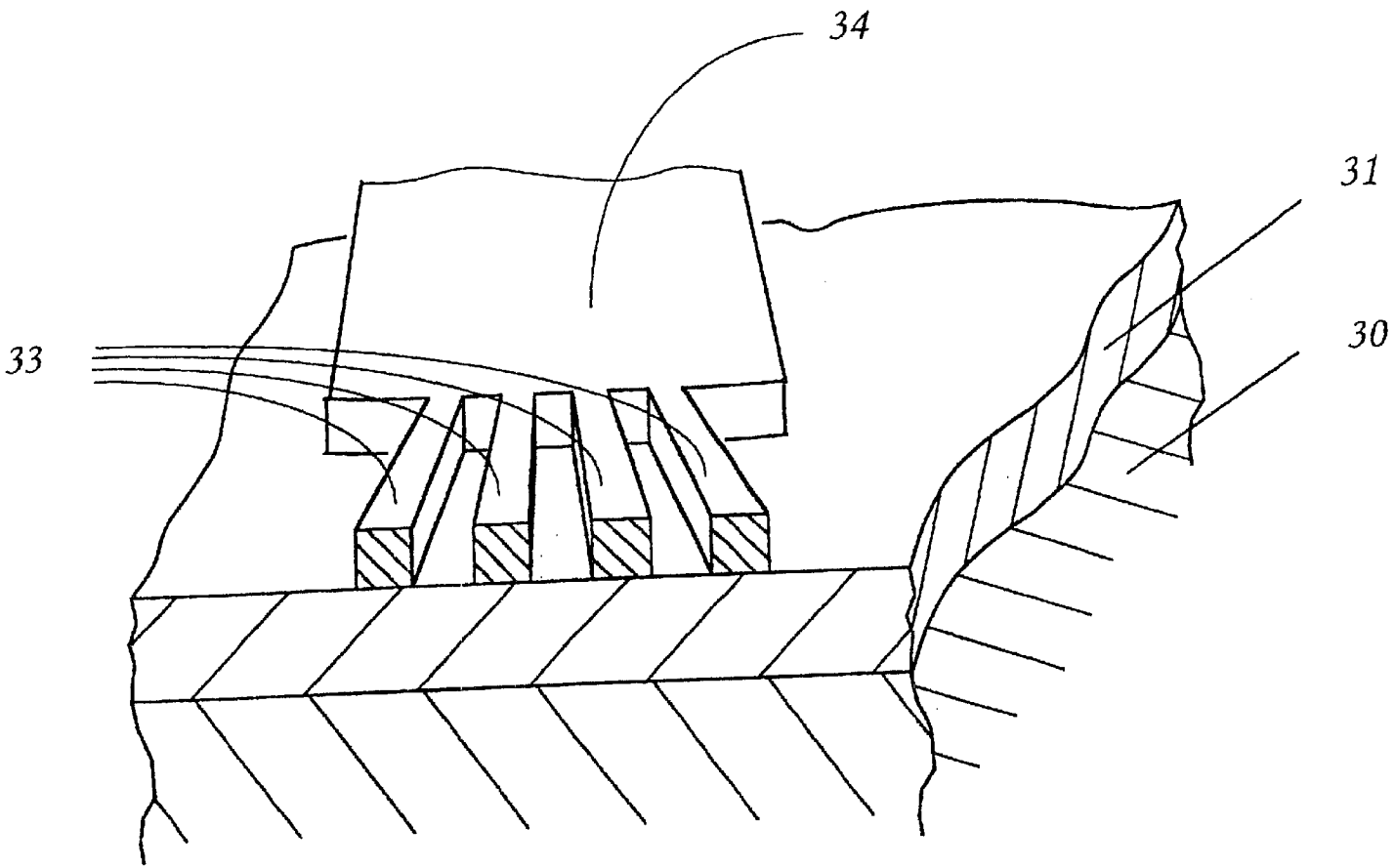
Figure 5:
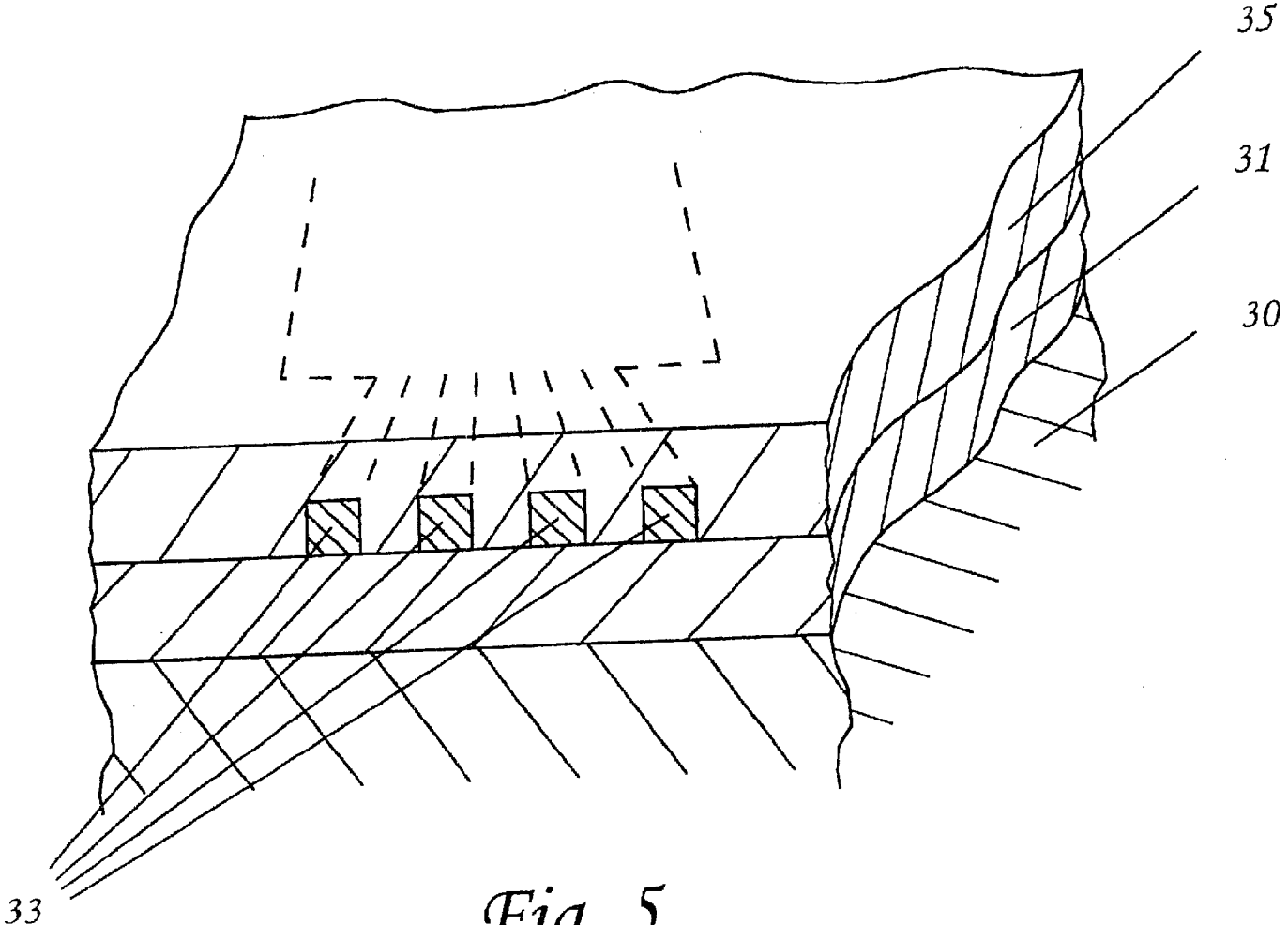

The method of constructing a multiplexer/demultiplexer device embodying the invention in a preferred form uses a known form of processing to create the required configuration of optical waveguides in an integrated waveguide optics structure. Successive stages of this processing are schematically illustrated in FIGS. 3, 4 and 5. Referring in the first instance to FIG. 3, a layer 31 of cladding glass, typically a layer of silica, is deposited upon a planar substrate 30, typically a silicon substrate. On layer 31 is deposited a layer 32 of core glass having a refractive index a controlled amount grater than that of the cladding glass layer upon which it is deposited. Typically the core glass layer 32 is composed of doped silica. Standard photolithographic techniques are then used to pattern this layer to define the required configuration of waveguides. For illustrative purposes, the portion of integrated waveguide optics structure illustrated in FIGS. 3, 4 and 5 includes portions of four single mode optical waveguides 33 in each of which a waveguiding effect is provided both in the direction normal to the plane of the layer 32 and in the direction lying in the plane to that layer that is at right-angles to the axial direction of that waveguide. These four waveguides 33 are shown terminating in a planar waveguide region 34 in which there is still a waveguiding effect in the direction normal to the plane of layer 32, but in which light is able to radiate laterally from any one of the waveguides 33. After completion of the patterning of layer 32, it is covered with a further layer 35 of cladding glass whose refractive index is less than that of core glass layer 32, preferably having an index matched with that of cladding glass layer 31. Typically this cladding glass layer 35 is also made of doped silica, the doping in this instance not being chosen to raise the refractive index of the host material, but to lower its flow temperature.

Figure 6:
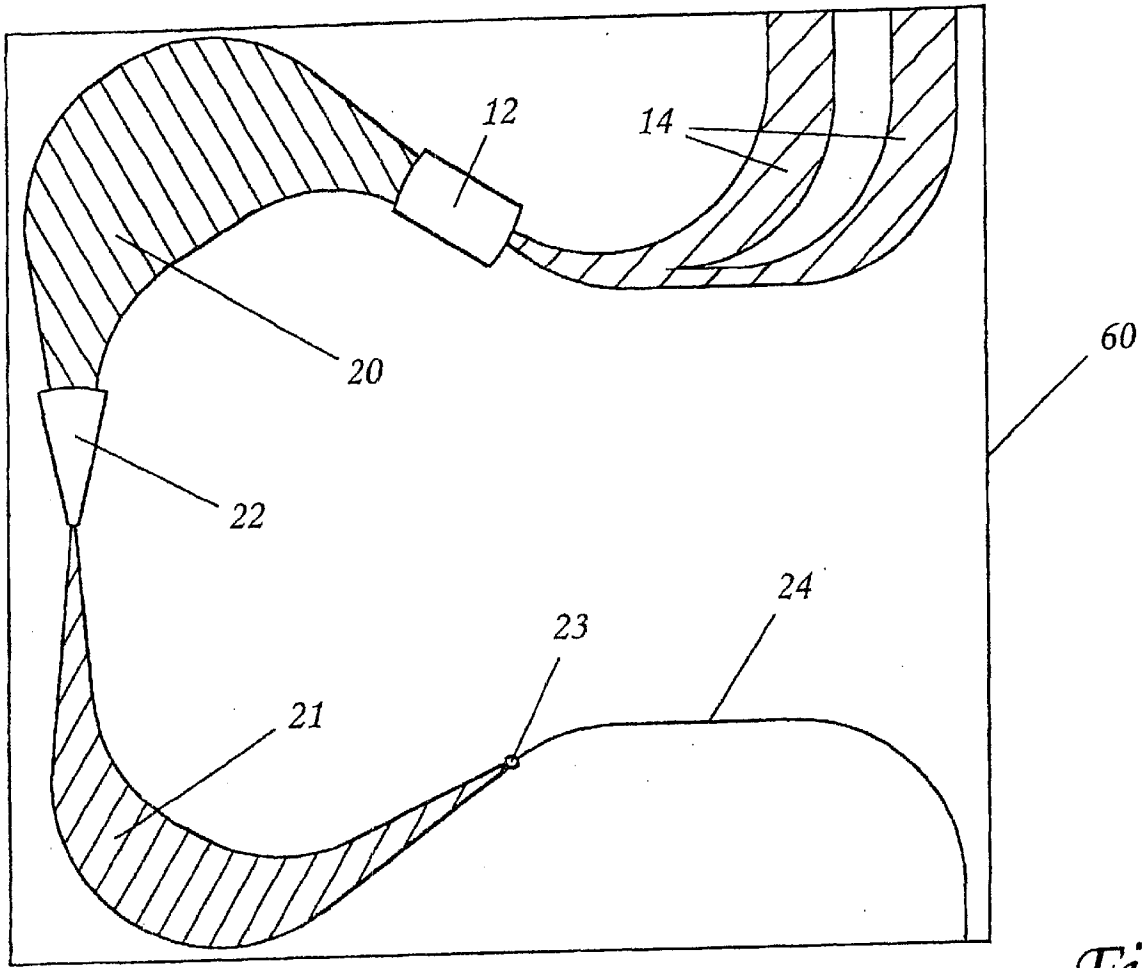
FIG. 6 is a schematic diagram of the overall configuration of the multiplexer/demultiplexer.

Whereas FIG. 2 depicts an entirely schematic layout of the components of the multiplexer/demultiplexer, FIG. 6 depicts the actual layout in integrated waveguide optics format of a particular example of multiplexer/demultiplexer, this example being designed for multiplexing/demultiplexing signals in the wavelength region of 1.5 $\mu$m having a channel spacing of 200 GHz. In FIG. 6 the integrated waveguide structure, which has the general structure illustrated in FIG. 5, is indicated generally at 60, and its waveguide components are indicated with the same reference numerals as are employed in indicate their counterparts in the FIG. 2 multiplexer/demultiplexer. The substrate of the structure 60 is a silicon substrate 30 (FIG. 5), its lower cladding glass layer 31 (FIG. 5) is a silica layer 12 $\mu$m thick, and its core glass layer 32 (FIG. 3) is a 6 $\mu$m layer of silica doped to raise its refractive index by $\Delta$=0.012 above that of the lower cladding glass layer. Once the layer 32 has been patterned to define all the 2-dimensional and 1-dimensional waveguides 33 and 34 (FIG. 4) that go to make all the waveguide elements of all the components 12, 14, and 20 to 24 of the multiplexer/demultiplexer, it is covered with a 14 $\mu$m thick layer of doped silica having a refractive index matching that of undoped silica and constituting the upper cladding glass layer 36 (FIG. 5). In this particular example the design is for multiplexing/demultiplexing 16 channels, and so there are 16 waveguides in the set of output waveguides 14, these being arranged in two groups at their outboard ends in order to facilitate being optically coupled with the fibres of two 8-fibre fibre ribbons (not shown). The diffraction gratings 20 and 21 have matched FSRs, and comprise arrays of 180, and of 6, waveguides respectively, the ratio (30:1) being chosen to be significantly larger than the number (16) of channels.

Figure 7:
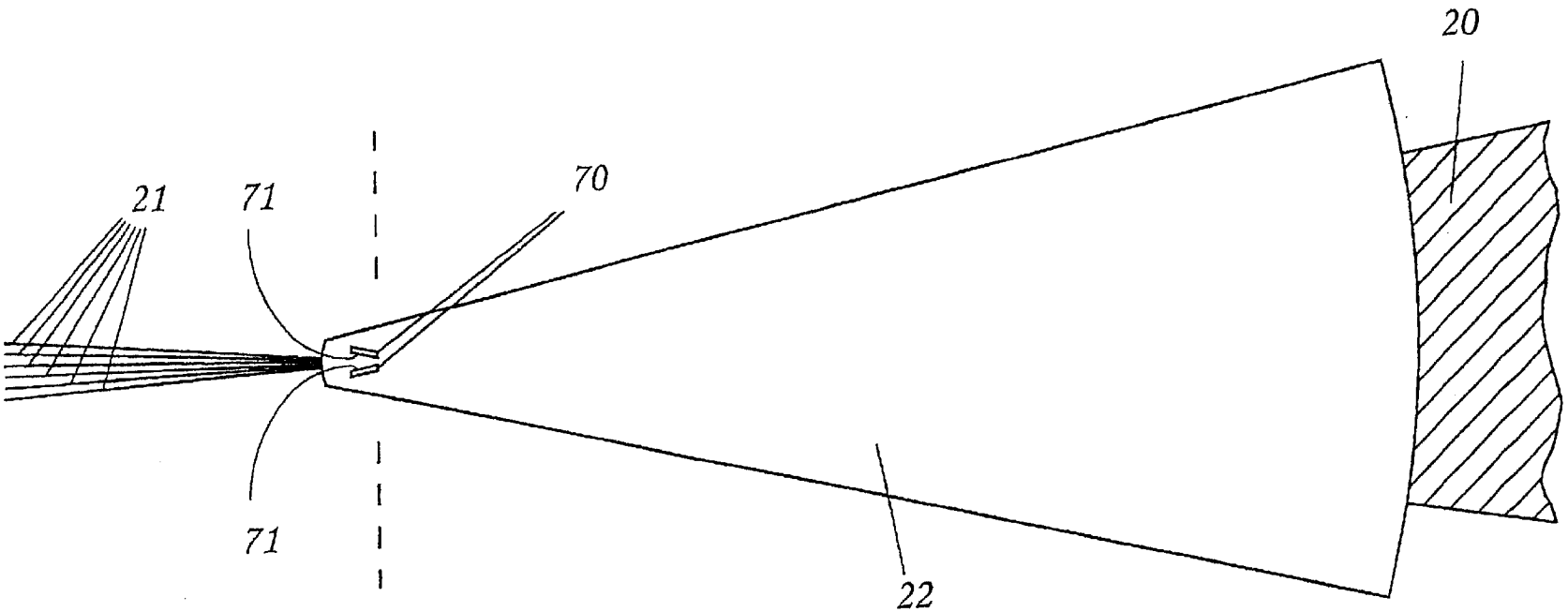
FIG. 7 is a schematic view on an enlarged scale of a portion of the multiplexer/demultiplexer of FIG. 6.

At that end of grating 21 that abuts coupling region 22 the six waveguides of the grating are on a pitch of 8 $\mu$m, and are oriented to form the image plane 25 (first illustrated in FIG. 2) at a depth of about 200 $\mu$m in from the abutment surface. In FIG. 6 the coupling region is depicted on too small a scale for it to be convenient specifically to identify the location of the image plane 25, but its location is indicated in FIG. 7, which depicts the coupling region 22 on a larger scale. From the parameters of this particular multiplexer/demultiplexer it has been calculated that a field stop is wanted that will allow only the central 27 $\mu$m width of this image plane to couple to the grating 20. This field stop function is provided by a pair of troughs 70 (FIG. 7) arranged in the pattern of an open chevron, and etched deep into the integrated waveguide optics structure 60 so as to penetrate right through its upper cladding glass and core glass layers 36 and 32, and well into, if not completely through, the lower cladding glass layer 31. Each of these troughs 70 has a long side-wall facet that obliquely faces the grating 21 and is oriented at a sufficient angle thereto for specular reflection in that facet to be total internal reflection at that facet. In the specific example the included angle between facets 71 is chosen to be 36°. At their inner ends, the facets 71 are only 27 $\mu$m apart so as to define between them the desired aperture width. At their outer ends, they are only slightly less than three times as far apart so as to be somewhat further apart than the total spread (48 $\mu$m) of the six waveguides of grating 21 at its abutment with the coupling region 22. These linear and angular dimensions ensure that neither by single nor multiple specular reflection in these facets is light able to couple from the waveguides of grating 21 into those of grating 20, or back again into the waveguides of grating 21.

Figure 8:
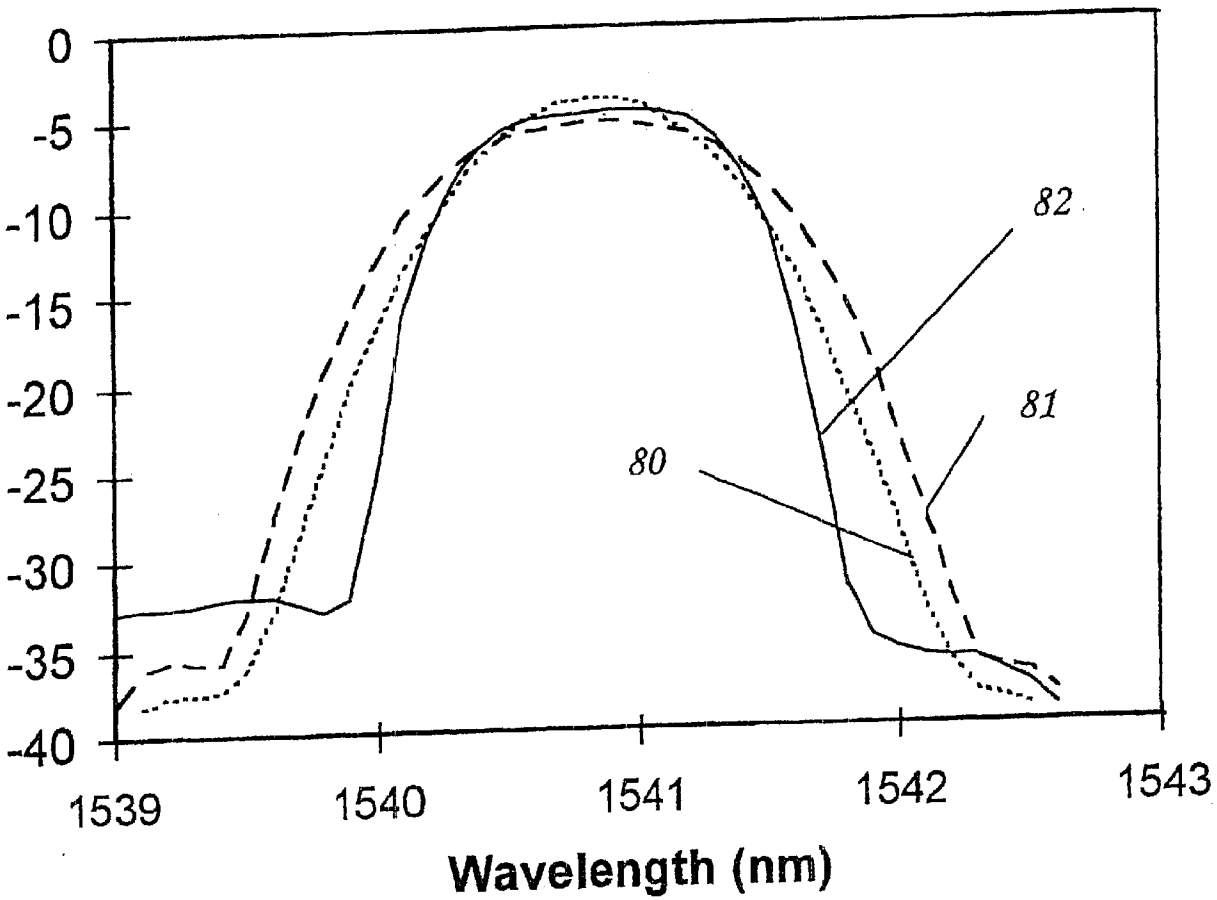
FIG. 8 depicts comparative plots of the wavelength sensitivity of different forms of multiplexer/demultiplexer.

The effect of the field stop can be seen in FIG. 8. Trace 80 is a plot of the wavelength characteristic of a single diffraction grating demultiplexer as described with reference to FIG. 1. Trace 81 is the corresponding plot that was obtained in respect of a tandem diffraction grating demultiplexer as described with reference to FIGS. 2 to 7, except for the complete omission of the field stop. Trace 82 is the corresponding plot obtained in respect of a tandem diffraction grating demultiplexer as decried with reference to FIGS. 2 to 7 that does include the field stop as particularly described with reference to FIG. 7.

I claim:

1. An optical multiplexer/demultiplexer for the multiplexing/demultiplexing of optical signal channels at a substantially uniform optical frequency spacing, which multiplexer/demultiplexer includes, in an integrated waveguide optics structure, a set of input/output ports optically coupled with an output/input port via a tandem arrangement of first and second optical waveguide diffraction gratings that provide multiple optical waveguide paths from each member of the set of input-output ports to the output/input port via different grating elements of the gratings, wherein the difference in optical path length occasioned by paths via adjacent optical waveguide elements of the first grating is greater than that occasioned by paths via adjacent optical waveguide elements of the second grating, wherein said difference in optical path length defines for its associated grating a frequency range, the Free Spectral Range, being the frequency range over which said optical path length difference produces a phase difference whose value ranges over $2\pi$, wherein the Free Spectral Range of the first diffraction grating is matched with the optical frequency spacing of the optical signal channels, wherein the Free Spectral Range of the second diffraction grating is at least as great as *the sum formed by the addition of the difference in frequency between adjacent frequency channels of the multiplexer/demultiplexer* the difference in frequency between the highest and lowest frequency channels of the multiplexer/demultiplexer, wherein the portion of the optical coupling between the set of input/output ports and the output/input port that extends between the first and second diffraction gratings couples spatial information between the two gratings in addition to intensity information, and includes a field stop constituted by a pair of reflecting facets, inclined at an acute angle to each other, created by the provision of wells in the integrated waveguide optics structure, and defining between them an aperture through which all light coupled between the first and second diffraction gratings is coupled, and wherein the length of the facets and the angle between them are related such that light emitted from either diffraction grating is not able, by multiple reflection in the facets, to couple into the other diffraction grating, or back into the same diffraction grating from which that light was emitted.

2. An optical multiplexer/demultiplexer as claimed in claim 1, wherein the dispersion of the first grating is substantially matched with that of the second.

3. A wavelength division multiplexed optical transmission system including at least one multiplexer as claimed in claim 2.

4. A wavelength division multiplexed optical transmission system including at least one demultiplexer as claimed in claim 1.

* * * * *